United States Patent
Engel

(10) Patent No.: US 11,302,069 B2
(45) Date of Patent: Apr. 12, 2022

(54) IMPLICIT SURFACE SHADING IN MEDICAL VOLUMETRIC RENDERING

(71) Applicant: Siemens Healthcare GmbH, Erlangen (DE)

(72) Inventor: Klaus Engel, Nuremberg (DE)

(73) Assignee: SIEMENS HEALTHCARE GMBH, Erlangen (DE)

(*) Notice: Subject to any disclaimer, the term of this patent is extended or adjusted under 35 U.S.C. 154(b) by 0 days.

(21) Appl. No.: 17/016,506

(22) Filed: Sep. 10, 2020

(65) Prior Publication Data

US 2021/0090325 A1 Mar. 25, 2021

(30) Foreign Application Priority Data

Sep. 23, 2019 (EP) .................................. 19198933

(51) Int. Cl.
| | |
|---|---|
| *G06T 15/83* | (2011.01) |
| *G06T 7/11* | (2017.01) |
| *G06K 9/62* | (2006.01) |
| *G06T 15/06* | (2011.01) |
| *G06T 15/08* | (2011.01) |

(Continued)

(52) U.S. Cl.
CPC ............ *G06T 15/83* (2013.01); *G06K 9/6267* (2013.01); *G06T 7/11* (2017.01); *G06T 15/06* (2013.01); *G06T 15/08* (2013.01); *G06F 3/04847* (2013.01); *G06K 2209/05* (2013.01); *G06T 2200/24* (2013.01); *G06T 2210/41* (2013.01)

(58) Field of Classification Search
CPC .......... G06T 15/83; G06T 7/11; G06T 15/06; G06T 15/08; G06T 2200/24; G06T 2210/41
See application file for complete search history.

(56) References Cited

U.S. PATENT DOCUMENTS

| 9,619,920 B2* | 4/2017 | Howell ................... G06T 15/80 |
| 9,767,599 B2* | 9/2017 | Lamy ..................... G06T 15/50 |

(Continued)

OTHER PUBLICATIONS

Kroes, Thomas et al. "Interactive direct vol. rendering withphysically-based lighting" Eurographics 2012 https ://graphics.tudelft.nl /Publications-new/2012/KPB12a/Kroes2011.pdf.

(Continued)

*Primary Examiner* — David T Welch
(74) *Attorney, Agent, or Firm* — Harness, Dickey & Pierce, P.L.C.

(57) ABSTRACT

In one embodiment, a method is for rendering medical volumetric images from received volumetric data, using a cinematic rendering approach, based on a Monte Carlo path tracing algorithm (MCPT). The MCPT algorithm uses at least one microfacet-based bidirectional reflectance distribution function (BRDF) for computing a probability how light is reflected at an implicit surface which is used for shading the implicit surface. In one embodiment, the method includes detecting if a surface scatter event is triggered. If yes, the method includes modifying the computation of a local gradient in the BRDF by perturbing the respective received volumetric data by applying a noise function for simulating a roughness of the implicit surface; and shading the implicit surfaces for rendering the received volumetric data.

16 Claims, 1 Drawing Sheet

(51) Int. Cl.
*G06F 3/0484* (2013.01)
*G06F 3/04847* (2022.01)

(56) References Cited

U.S. PATENT DOCUMENTS

| | | | |
|---|---|---|---|
| 2004/0125103 A1* | 7/2004 | Kaufman | G06T 15/40 |
| | | | 345/419 |
| 2007/0018996 A1* | 1/2007 | Wang | G06T 15/50 |
| | | | 345/592 |
| 2009/0167763 A1* | 7/2009 | Waechter | G06T 17/005 |
| | | | 345/426 |
| 2009/0226049 A1* | 9/2009 | Debevec | G06K 9/00221 |
| | | | 382/118 |
| 2014/0232719 A1* | 8/2014 | Wahrenberg | G06T 15/08 |
| | | | 345/424 |
| 2016/0321381 A1* | 11/2016 | English | G06F 30/20 |
| 2016/0343161 A1 | 11/2016 | Paladini et al. | |
| 2017/0061672 A1* | 3/2017 | Zhou | G06K 9/00147 |
| 2017/0245962 A1* | 8/2017 | Skamser | G02B 5/0257 |
| 2017/0294042 A1 | 10/2017 | Engel | |
| 2018/0068590 A1* | 3/2018 | Mattausch | G09B 23/286 |
| 2018/0227568 A1* | 8/2018 | Vetter | G06T 15/205 |
| 2018/0308278 A1* | 10/2018 | Qiu | G06T 15/005 |
| 2018/0330538 A1* | 11/2018 | Petkov | G06T 15/08 |
| 2019/0005710 A1* | 1/2019 | Irrgang | G06T 15/50 |
| 2019/0096119 A1* | 3/2019 | Petkov | G06T 7/11 |
| 2019/0320875 A1* | 10/2019 | Jones | A61B 5/1459 |
| 2019/0347526 A1* | 11/2019 | Sunkavalli | G06K 9/46 |

OTHER PUBLICATIONS

"OpenGL Software Development Kit", GL Intercept, OpenGL, https://www.opengl.org/sdk/tools/GLIntercept/, abgerufen am Jul. 16, 2019;.

Engel, Klaus "Real-Time Monte-Carlo Path Tracing of Medical Volume Data" GPU Technology Conference, Apr. 4-7, 2016, San Jose Convention Center, CA, USA.

Wikipedia.org, "Finite difference", abrufbar unter: https://en.wikipedia.org/wiki/Finite_difference, Stand 2019;.

Kroes, Thomas et al. "Exposure Render: An Interactive Photo-Realistic Volume Rendering Framework" Plos One; vol. 7, No. 7, Jul. 2012 // DOI: 10.1371/journal.pone.0038586;.

* cited by examiner

IMPLICIT SURFACE SHADING IN MEDICAL VOLUMETRIC RENDERING

PRIORITY STATEMENT

The present application hereby claims priority under 35 U.S.C. § 119 to European patent application number EP 19198933.4 filed Sep. 23, 2019, the entire contents of which are hereby incorporated herein by reference.

FIELD

Various examples of embodiments of the present invention generally relate to a method and a rendering apparatus, a system and a computer program for rendering medical volumetric images, based on cinematic rendering.

BACKGROUND

Medical imaging has impacted the practice of medicine during the recent decades, contributing to greatly improved disease diagnosis, treatment and follow-up. Image-guided, minimally invasive procedures are becoming more and more common in hospitals, replacing conventional surgery and allowing faster recoveries with fewer post-procedure complications. We anticipate that this trend will continue, medical imaging playing an increasingly important role towards moving precision medicine into clinical practice. By being able to characterize anatomy, physiology and metabolism of the patient, medical imaging enables precise, personalized procedures and predictive, patient-specific therapy selection and delivery.

For medical diagnostic purposes, volume data can be generated for example by a computer tomograph scanner or a magnetic resonance imaging scanner as CT or MRI/MRT images. Trained medical personnel can interpret the "image slices" and can explain their findings, for example, it may be desirable to have image information for a diagnosis or a planned surgical procedure.

To this end, in order to show the information contained in volumetric data of different origins like CT, MRI, PET, or other image producing modalities in such a way that even an untrained person can identify elements of interest in the volume, it has been proposed in WO 2016/045701 A1 to apply a method called "cinematic rendering" to show the information as a "3D image", i.e. a two-dimensional view (shown on a computer monitor, for example) of the three-dimensional volume data, showing the object of interest in a very realistic manner. More details to the cinematic rendering technique can be found in K. Engel, Real-Time Monte-Carlo Path Tracing of Medical Volume Data, GPU Technology Conference, Apr. 4-7, 2016, Calif., USA, San Jose Convention Center (2016). This technique allows the viewer to observe the three-dimensional "object" (for example the head, thorax, abdomen etc.) from any viewpoint or at any level of detail, and to clearly identify different object or elements such as bone, muscle, blood vessels, therapeutic inorganic material, such as implants etc.

The results of cinematic rendering algorithms or renderers are physically plausible images that are often easier for the human brain to interpret, since the brain is trained to interpret the slightest shading cues to reconstruct shape and depth information. Such shading cues are often missing from computer generated images based on more simple geometric calculations such as ray casting. In particular, Cinematic Rendering computes in real-time the interaction of visible photons with the scanned patient anatomy. The algorithm uses a Monte Carlo path tracing method to generate photorealistic or even hyper-realistic images by light transport simulation along hundreds or thousands of photons paths per pixel, implemented in iterations through the anatomy using a stochastic process to render the volume data in a three-dimensional image.

In this technique, many virtual paths are traced in a reverse manner, i.e. originating from pixels of the image plane and travelling through the volume. The color and intensity of a pixel in the image plane is determined by a global radiance map (defining the direction, color and brightness of a virtual light source directed at the image) and whether the traced paths (originating from that pixel) are absorbed in the volume, whether they pass through the volume, or whether they undergo volumetric scattering or surface scattering in the volume. A path can undergo several scatter events before leaving the volume or being absorbed by the volume, for example. The parameters of each traced path are determined largely by properties of the data volume voxels such as their alpha values from the transfer function. Usually, a global transfer function assigns color and opacity values to each voxel of the volume. As the input data refer to volumetric data, no explicit surfaces, objects, or grid data are available. That is why, the surfaces are called "implicit".

When the data is rendered, the implicit surfaces are shaded probabilistically based on the magnitude of the local gradient. For shading, usually, diffuse and specular light maps are employed. The particular specular light map is pre-filtered for a specific specular lobe, which is dependent on the specular exponent in a e.g. Phong-based bidirectional reflectance distribution function (in the following called BRDF) model or surfaces roughness in microfacet-based BRDFs. For rendering different surface materials such as plastic or metal, it is desirable to allow different BRDFs for different implicit surfaces in Cinematic Rendering, for example dependent on the local scalar value of the surface or segmentation information.

SUMMARY

The inventors have discovered that in known approaches in state of the art, for allowing that the roughness of surfaces varies, the specular light map has to be re-computed (filtered) when the specular exponent or roughness parameter is changed. This re-computation step has the drawback of being computationally expensive.

Another option in known systems in state of the art is to pre-compute a set of specular light maps with different specular exponents or surface roughness which may then be selected for surface shading. However, the inventors have discovered that this second approach has the drawback of being memory-intensive.

At least one embodiment of the present invention provides an approach for rendering volumetric data by providing the option to render different objects or regions of interest (e.g. different materials like bone or implants or different categories of tissue) with different shadings while not increasing computational costs and memory costs.

Embodiments of the present invention are directed to a method for rendering medical volumetric images, by a renderer, by a computer program and/or a computer readable medium. Advantageous aspects, features and embodiments are described in the claims and in the following description together with advantages.

In a first embodiment, the present invention refers to a computer-implemented method for rendering medical volumetric images from volumetric data, received from an imaging modality or from a reconstruction or storage unit (like e.g. PACS), using a cinematic rendering approach. The method uses or executes a Monte Carlo path tracing algorithm (MCPT algorithm). The MCPT algorithm uses at least one and usually several microfacet-based bidirectional reflectance distribution functions (also abbreviated as BRDF) for computing a probability how light is reflected at an implicit surface which is used for shading the implicit surface. The method comprises:

detecting if a surface scatter event is triggered and if yes:

modifying the computation of a local gradient in the BRDF by perturbing the respective received volumetric data, required for the gradient computation, by applying a noise function for simulating a roughness of the implicit surface; and shading the implicit surfaces by using the modified BRDF, as mentioned in the preceding 'modifying' step for rendering the received volumetric data.

In another embodiment, the invention relates to a system for rendering medical volumetric images from received volumetric data, comprising or accessing:

a user interface for example with a slider bar for adjusting a roughness parameter for different objects to be used by the renderer;

a renderer as mentioned above for executing the method according to any of the preceding method claims;

an output interface for providing rendered medical volumetric images with varying surface roughness for different objects in the volumetric data.

In another embodiment, the invention relates to a computer program product comprising a computer program or to a computer program comprising program elements which induce a computer to carry out the steps of the method for rendering medical volumetric images according to the method of an embodiment, when the program elements are loaded into a memory of the computer.

In another embodiment, the invention relates to a computer-readable medium on which program elements are stored that can be read and executed by a computer, in order to perform steps of the method for rendering medical volumetric images according to the method of an embodiment, when the program elements are executed by the computer.

In another embodiment, the invention relates to a method for rendering medical volumetric images from respectively received volumetric data, using a cinematic rendering approach, based on a Monte Carlo path tracing algorithm (MCPT), the MCPT algorithm being configured to use at least one microfacet-based bidirectional reflectance distribution function (BRDF) for computing a probability how light is reflected at an implicit surface usable for shading the implicit surface, the method comprising:

detecting if a surface scatter event is triggered and upon detecting that the surface scatter event is triggered:

modifying a computation of a local gradient in the BRDF by perturbing respectively received volumetric data by applying a noise function for simulating a roughness of the respective implicit surface; and shading respective implicit surfaces for rendering the respectively received volumetric data.

In another embodiment, the invention relates to a renderer for rendering medical volumetric images with an input interface for receiving volumetric data, the renderer being adapted to be implemented on or to access at least one processor unit for executing a cinematic rendering, based on a Monte Carlo path tracing algorithm (MCPT), wherein the MCPT algorithm uses at least one microfacet-based bidirectional reflectance distribution function (BRDF) for computing a probability how light is reflected at an implicit surface used for shading the implicit surface, the renderer comprising:

a surface scatter detection unit to detect if a surface scatter event is triggered; and a modifier to modify computation of a local gradient in the BRDF by perturbing respectively received volumetric data by applying a noise function for simulating a roughness of the implicit surface used for shading the implicit surfaces for rendering the respectively received volumetric data.

In another embodiment, the invention relates to a system for rendering medical volumetric images from received volumetric data, comprising or accessing:

a user interface including a slider bar to adjust a roughness parameter for different objects to be used by the renderer of an embodiment;

the renderer of an embodiment;

an output interface to provide rendered medical volumetric images with varying surface roughness for different objects in the volumetric data.

In another embodiment, the invention relates to a non-transitory computer program storing program elements, configured to induce a computer to carry out the method for rendering medical volumetric images of an embodiment, when the program elements are loaded into a memory of the computer.

In another embodiment, the invention relates to a non-transitory computer-readable medium storing program elements, readable and executable by a computer, to perform the method for rendering medical volumetric images of an embodiment, when the program elements are executed by the computer.

DETAILED DESCRIPTION OF THE EXAMPLE EMBODIMENTS

Figure 1:
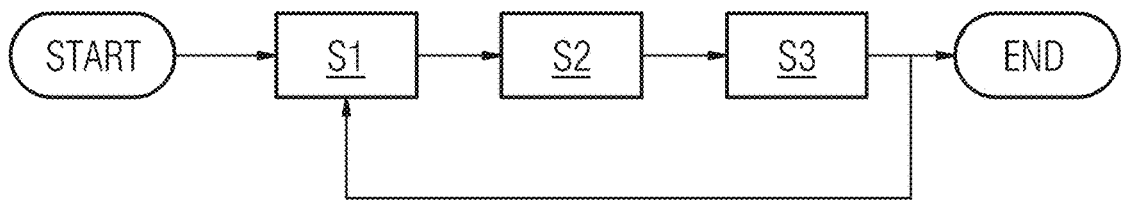
FIG. 1 is a flow chart of a method according to a preferred embodiment of the present invention.

The above and other elements, features, steps, and concepts of the present disclosure will be more apparent from the following detailed description in accordance with example embodiments of the invention, which will be explained with reference to the accompanying drawings.

Some examples of the present disclosure generally provide for a plurality of circuits, data storages, connections, or electrical devices such as e.g. processors. All references to these entities, or other electrical devices, or the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations, and elements illustrated in the drawings are not necessarily shown to scale. Rather, the various elements are represented such that their function and general purpose become apparent to a person skilled in the art. Any connection, or communication, or coupling between functional blocks, devices, components, or other physical or functional units shown in the drawings or described herein may also be implemented by an indirect connection or coupling. A communication between devices may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In a first embodiment, the present invention refers to a computer-implemented method for rendering medical volumetric images from volumetric data, received from an imaging modality or from a reconstruction or storage unit (like e.g. PACS), using a cinematic rendering approach. The method uses or executes a Monte Carlo path tracing algorithm (MCPT algorithm). The MCPT algorithm uses at least one and usually several microfacet-based bidirectional reflectance distribution functions (also abbreviated as BRDF) for computing a probability how light is reflected at an implicit surface which is used for shading the implicit surface. The method comprises:

detecting if a surface scatter event is triggered and if yes:

modifying the computation of a local gradient in the BRDF by perturbing the respective received volumetric data, required for the gradient computation, by applying a noise function for simulating a roughness of the implicit surface; and shading the implicit surfaces by using the modified BRDF, as mentioned in the preceding 'modifying' step for rendering the received volumetric data.

By modifying the computation of the local gradient in the BRDF, the BRDF will be modified accordingly. The so modified BRDF will be used for computation of the shading by the shader.

At least one embodiment of the invention has the technical advantage that different structures, objects or materials in the volumetric data can be rendered and in particular shaded differently in order to make them differentiable for the purpose of finding or providing a medical diagnosis. With this approach the quality of medical diagnosis may be improved as the underlying medical image information within the structures may be provided in an improved manner. This is a major advantage since the quality of the image information is key when providing a medical diagnosis for a patient. This becomes even more relevant, when the image information is the only information to generate an answer to a medical question.

Further, the memory resources for storing pre-computed specular light maps may be avoided and are not necessary anymore. In addition, the processing power of the computing resources may be saved as no re-computation of specular light maps is necessary for different specular components.

According to a preferred embodiment, the noise function is a procedural noise function. The noise function may be user controlled or scaled by a user-defined roughness parameter by means of activating a slider bar on a graphical user interface of the application, i.e. the application executing or controlling the computer-implemented method. This has the advantage that shading properties and in particular a roughness parameter may be controlled in response to special configurations of the actual use case. With this, for example priority may be given to the differentiation between specific structures (e.g. bone vs. implants).

According to another preferred embodiment, the roughness parameter may be determined specifically for different objects or materials in the received volumetric data. Thus, each of the different objects and/or materials is shaded specifically. The roughness parameter may be determined by using a local grey value, segmentation or object classification information (a segmentation or classification step may be provided as a preceding step in order to provide a segmented image or classified objects within the image data) and/or other image processing parameters, including gradient magnitude and/or curvature. With other words the roughness parameter may be modified by the grey value in the volume data. For example, brighter voxel may be assigned to or have a lower roughness parameter. This feature may also be implemented by means of a transfer function, which maps voxel values to roughness values.

According to a further preferred embodiment, the method further comprises:

segmenting or classifying different objects or materials or tissue types in the received volumetric data;

receiving a roughness parameter to be used for scaling the noise function for each segmented or classified object separately; and applying the specifically scaled noise function to each of the BRDFs for each segmented or classified object.

Alternatively, the volume data have may be subject to a preceding segmentation procedure, so that the roughness parameter may be specifically determined based on the segmentation or classification. With this feature, it is possible to render the objects of a first category (of one type, e.g. implants) with a first shading and objects of a second category (e.g. bone or other body structures) in a second (different) shading. This improves differentiability of the different objects (e.g. tissue types) within an image. Thus, the scaling (of the modification) may be dependent on the segmentation or classification as well.

In another preferred embodiment, it is possible that for each of the segmented or classified objects different BRDFs may be applied, which may be scaled by different roughness parameters. This improves adaptability of the rendering application, in particular for prioritizing specific structures or diagnostic aspects (e.g. different vessel types in vascular diseases etc.).

In another preferred embodiment, the detection whether a surface scatter event is (or has been) triggered is executed by first detecting if a scatter event is triggered and (only) if yes:

computing the local gradient by modifying local samples for the gradient computation by using the noise function; and computing a probability for a surface scatter event by executing a surface scatter probability density function. With other words in reply to the detection of a scatter event, a probability of a surface scatter event is computed by executing a surface scatter probability density function in dependence of a magnitude of a local gradient. This feature makes the modified computer-implemented shader module more efficient.

In another preferred embodiment, a scatter event is triggered by:

comparing if accumulated opacity values along the path are exceeding a pre-defined threshold value and if yes:

triggering a scatter event, wherein the threshold value is computed by executing a scatter probability density function. The scatter probability density function is typically different from the surface scatter probability density function. This has the technical effect that the computations may be executed more efficiently.

In another preferred embodiment, the local gradient is computed by modifying central difference samples of a central difference algorithm or by modifying higher order difference samples of a higher order difference algorithm. For more detailed information, it is referred to https://en.wikipedia.org/wiki/Finite_difference. Generally, higher-order differences provide gradients with higher quality and avoid artefacts or image failures.

In another preferred embodiment, the shading of the implicit surfaces is modified on the fly during rendering. This helps to reduce processing times and makes the method much more attractive for end users as time for a profound diagnosis may be reduced.

In still another preferred embodiment, the method accesses a memory storage in which only one single non-filtered specular light map is stored to be used for computing a shading with a varying surface roughness for different objects. Thus, memory capacity may be reduced as no sets of specular light maps are to be stored.

Up to now, the invention has been described with respect to the claimed method. Features, advantages or alternative embodiments mentioned in this context can also be assigned to the other claimed objects (e.g. the renderer, the computer program or a computer program product) and vice versa. In other words, the subject matter which is claimed or described with respect to the apparatus (e.g. renderer) can be improved with features described or claimed in the context of the method and vice versa. In this case, the functional features of the method are embodied by structural units of the system and vice versa, respectively. Generally, in computer science a software implementation and a corresponding hardware implementation are equivalent. Thus, for example, a method step for "shading" data may be performed with a shader (computing unit) and respective instructions for shading surfaces to be rendered. For the sake of avoiding redundancy, although the renderer may also be used in alternative embodiments described with reference to the method, these embodiments are not explicitly described again for the renderer.

In another embodiment, at least one embodiment of the present invention refers to a renderer for rendering medical volumetric images. The renderer or rendering unit is a computer-implemented unit and may be provided in hardware and/or software and is equipped with an input interface for receiving volumetric data. The renderer is adapted to execute the method as described above and may be configured for executing any of the above mentioned steps.

In particular, the renderer may be implemented on or may access a processing unit (graphics processing unit or central processing unit) for executing a cinematic rendering, based on a Monte Carlo path tracing algorithm (MCPT), wherein the MCPT algorithm uses at least one microfacet-based bidirectional reflectance distribution function (BRDF) for computing a probability how light is reflected at an implicit surface which is used for shading the implicit surface. The renderer additionally comprises:

a surface scatter detection unit for detecting if a surface scatter event is triggered and a modifier for modifying the computation of a local gradient in the BRDF by perturbing the respective received volumetric data (required for the gradient computation) by applying a noise function for simulating a roughness of the implicit surface used for shading the implicit surfaces for rendering the received volumetric data.

The renderer is computer-implemented and comprises a modified shader module for gradient computation. The modification refers to the fact that renderer comprises a modifier for modifying (perturbing) the local gradients by small random numbers for simulating a roughness of an implicit surface.

The renderer may comprise a shader (module) for calculating the shading. The modified BRDF may be used by the shader. Thus, the shader proposed herein may be provided as Add-On module for known systems or renderers. The shader is adapted accordingly as described above with respect to the method.

Typically rendering calculations are complex and resource intensive. That is why rendering calculations are usually outsourced to the graphics processing unit (GPU) over e.g. OpenGL in real-time. Thus, the method and the modified shader may be outsourced to the GPU as well. Shaders may e.g. be written in OpenGL Shading Language and compiled. The compiled programs are then executed on the GPU.

In another embodiment, the invention relates to a system for rendering medical volumetric images from received volumetric data, comprising or accessing:

a user interface for example with a slider bar for adjusting a roughness parameter for different objects to be used by the renderer;

a renderer as mentioned above for executing the method according to any of the preceding method claims;

an output interface for providing rendered medical volumetric images with varying surface roughness for different objects in the volumetric data.

Thus, in contrast to known rendering applications, an additional user interface is provided, e.g. in the form of a slider bar. The slider bar is used to modify the roughness parameter used for shading. Although in known applications in state of the art, a user can interact with the rendered three-dimensional "object" to alter the point of view, the level of illumination, the type of tissue to be displayed, etc. such a particular user interface element with the assigned functionality for changing a roughness to be used for shading different types of objects is not known in the art. For example, in state of the art systems, the user can switch from a frontal view to a side view; the user can switch between a view in which only bone is displayed to a view in which muscle and other tissue types are also shown, etc. However, changing roughness parameters to be instantaneously considered for shading is not known.

In another embodiment, the invention relates to a computer program product comprising a computer program or to a computer program comprising program elements which induce a computer to carry out the steps of the method for rendering medical volumetric images according to the method of an embodiment, when the program elements are loaded into a memory of the computer.

In another embodiment, the invention relates to a computer-readable medium on which program elements are stored that can be read and executed by a computer, in order to perform steps of the method for rendering medical volumetric images according to the method of an embodiment, when the program elements are executed by the computer.

The realization of embodiments of the invention by a computer program product and/or a computer-readable medium has the advantage that already existing computers like servers or clients can be easily adopted by software updates in order to work as proposed by embodiments of the invention.

In the following a definition of terms used within this application is given.

The method is computer-implemented. The computer for executing the rendering and shading task, mentioned above, may be a personal computer or a workstation in a computer network and may include a processing unit, a system memory, and a system bus that couples various system components including the system memory to the processing unit. The system memory may include read only memory (ROM) and/or random access memory (RAM). A basic input/output system (BIOS), containing basic routines that help to transfer information between elements within the personal computer, such as during start-up, may be stored in ROM. The computer may also include several types of disk drive for reading from and writing to a disk. The hard disk drive, magnetic disk drive, and (magneto) optical disk drive may be coupled with the system bus by a hard disk drive interface, a magnetic disk drive interface, and a (magneto) optical drive interface, respectively. The drives and their associated storage media provide nonvolatile storage of machine readable instructions, data structures, program modules and other data for the computer. A number of program modules may be stored on the storage units, such as an operating system, one or more application programs, like the application for executing the method for rendering and shading volumetric medical images. A user may enter commands and information into the computer through input devices, such as a keyboard and pointing device, for example. Other input devices such as a microphone, joystick, game pad, or the like may also be included. These and other input devices are often connected to the processing unit through a serial port interface coupled to the system bus. A monitor (e.g. a GUI) or other type of display device may also be connected to the system bus via an interface, such as a video adapter for example. In addition to the monitor, the computer may include other peripheral output devices, such as speakers and printers for example.

The computer for executing the rendering method may be operated in a networked environment which defines logical connections to one or more remote computers. The remote computer may be another personal computer, a post processing workstation, a server, a router, a network PC, a peer device or other common network node, and may include many or all of the elements described above relative to the personal computer. The logical connections include a local area network (LAN) and a wide area network (WAN), an intranet and the Internet.

A scatter event refers to a probabilistic state in which light on a path of the Monte Carlo path tracing algorithm is scattered. A scatter event is triggered if accumulated opacity values along a path of MC path tracing algorithm for each sampling point are exceeding a predefined threshold value.

A surface scatter event is a subset of the scatter events and refers to a probabilistic state in which light on a path of the Monte Carlo path tracing algorithm cutting an implicit surface is scattered. This may be determined by a high magnitude of the gradient. A surface scatter event is triggered if a random number [0, 1] is less than the surface scatter probability density function used in the BRDF.

The properties, features and advantages of this invention described above, as well as the manner they are achieved, become clearer and more understandable in the light of the following detailed description, which will be described in more detail in the context of the drawings. This following description does not limit the invention on the contained embodiments. Same components or parts can be labeled with the same reference signs in different figures. In general, the figures are not for scale. It shall be understood that a preferred embodiment of the present invention can also be any combination of the dependent claims or above embodiments with the respective independent claim.

FIG. 1 shows a flow chart of the method for shading implicit surfaces in response to a roughness parameter.

After START of the method, in step S1 it is detected if a surface scatter event has been triggered or occurs. If such a surface scatter event has been detected, in step S2 the computation of the local gradients in the BRDF are modified. This modification is based on perturbing the respective received volumetric data, which are required for the gradient computation, by applying a noise function for simulating a roughness of the implicit surface. Subsequently in step S3 a shading for the implicit surfaces is computed used for rendering the received volumetric data. If all Monte Carlo iterations for all pixels of the volume are processed, the method may end (END); otherwise it will branch out to start again with step S1.

Generally, the present invention makes use of one single, non-filtered specular light map. In general, first the gradient has to be calculated for detecting if it is a surface scatter event (this depends on the magnitude of the gradient; generally, with a higher magnitude the probability for a surface scatter event is higher). When a scatter event is detected during the Monte Carlo path tracing algorithm, a local gradient is computed, for example using central differences. During the gradient computation, the local samples for the gradient computation are perturbed using small noise values computed on-the-fly in a modifier 14 of a renderer 10 (which will be explained in more detail below with respect to FIG. 3). In particular, each volume sample required for the gradient computation is modified by a small noise value. A roughness parameter [0.,1.] is used for modifying or scaling the amount of noise added to each gradient computation sample, thus allowing any surfaces roughness from zero (leading to a perfect mirror surface) to one (1) (for a diffuse surface).

The roughness parameter for the local gradient computation is modified either using the local grey value, segmentation information or any other parameter locally available (for example gradient magnitude, curvature, etc.). This allows for the specific and different rendering (in particular shading) of different materials or objects per volume data set, such as metal, plastic and different soft tissue types.

Shaders may e.g. be written in OpenGL Shading Language and compiled. The compiled programs are then executed on the GPU. In the following a GLSL code example using central differences is given.

```
---
// random number generator
float rand(float seed){return fract(sin(seed)*43758.5453123);}
// get perturbed volume sample, perturbation is scaled using
the roughness factor
float getVolumeSampleG(vec3 gradPos, float roughness)
{
    float v = texture(volumeTexture, gradPos) .x;
    v += ((rand(length(gradPos *100.))−.5)*roughness/15.);
    return v;
}
// computes a central difference gradient at gradPos with
lookup offsets defined by voxelOffset
vec3 computeGradient(vec3 gradPos, float roughness, vec3
voxelOffset)
    //samples for forward differences
    vec3 gradient;
    gradient.x =     getVolumeSampleG(vec3(gradPos.x +
voxelOffset.x, gradPos.y, gradPos.z), roughness)
    −
                    getVolumeSampleG(vec3(gradPos.x −
voxelOffset.x, gradPos.y, gradPos.z),
roughness);
```

```
-continued gradient.y =     getVolumeSampleG(vec3(gradPos.x, gradPos.y
+ voxelOffset.y, gradPos.z), roughness)
    −
                    getVolumeSampleG(vec3(gradPos.x, gradPos.y
− voxelOffset.y, gradPos.z),
roughness);
    gradient.z =     getVolumeSampleG(vec3(gradPos.x,
gradPos.y, gradPos.z + voxelOffset.z), roughness)
    −
                    getVolumeSampleG(vec3(gradPos.x,
gradPos.y, gradPos.z − voxelOffset.z),
roughness);
    // return central differences gradient
    return gradient;
}
---
```

After a scatter event has been triggered (and detected), a probability for a surface scatter event is computed based on a surface scatter probability density function PDF. The surface scatter probability density function PDF may be selected from the group consisting of:

```
- float PDF_BRDF = (1.0 − exp(−sd * gradMag));
- - float PDF_BRDF = sampleColor.a*(1.0 − exp(−sd *
    gradMag));
``` wherein sd is a surface modification factor or parameter, which may be user controlled. Default values may e.g. be: 10.0 for CT data, 1.0 for MR data. The factor or parameter defines how the surfaces are rendered by shading. "gradMag" refers to the local magnitude of the gradient and "sampleColor.a" refers to the alpha value of the transfer function.

A surface scatter event will be issued or triggered if a random number [0,1] is less than PDF_BRDF (in the code snippet above: "if (rand( )<PdfBrdf)").

The parameter sd may differ from object to object or form material to material, based on the respective grey values or on a preceding segmentation step.

A pseudo code of the modified shader module, suggested herein for the solution of the problem, which may be provided as Add-On to an existing application looks like:

```
For all MC-iterations
    For all Pixels
        Generate camera ray
        Intersect camera ray with bounding box of volume data
        Set sampling position to ray entry point of bounding
        box
        While path not terminated (absorption) and sample po-
        sition inside bounding box
            Compute opacity threshold for scatter event
            based on scatter PDF
            While no new scatter event detected
                Sample volume data
                Classify sample (transfer function lookup
                yielding color and o
                Accumulate opacity
                If scatter event is detected (based on ac-
                cumulated opacity and scatter probability
                density function)
                    Compute local gradient, by using the
                    proposed method or the Add-On Shader in the
                    renderer respectively for the suggested
                    modification: modify central differences
                    samples using noise/random numbers) to sim-
                    ulate surface roughness (roughness factor
                    scales noise)
```

```
           If surface scatter event is triggered
           („if (rand( ) < PdfBrdf) ")
                Surface shading computation with BRDF
                Change scatter ray direction in hemi-
                sphere
Else
                Change ray direction using volumetric
           phase function
                Advance ray position along ray direc-
                tion.
```

Figure 2:
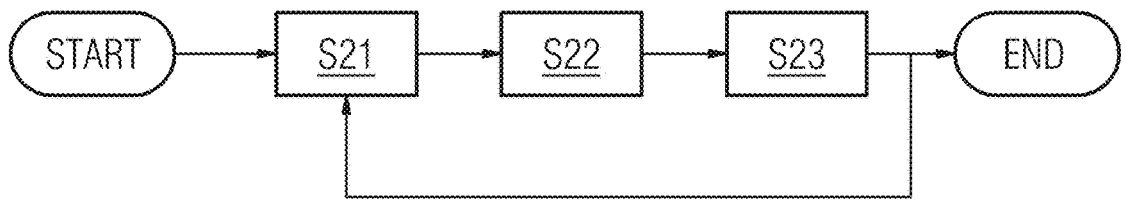
FIG. 2 is another flow chart according to another preferred embodiment of the present invention.

FIG. 2 shows a flow chart of a rendering method according to a preferred embodiment which includes a segmentation or classification step. After START of the method, in step S21 different objects or materials or tissue types are segmented or classified in the received volumetric data. In step S22 a roughness parameter is received. This may be done by reading the signals from the slider bar sb of a user interface (depicted in FIG. 3). The received roughness parameter is used for scaling the noise function for each segmented or classified object separately. In step S33 the specifically modified or scaled noise function is applied to each of the different BRDFs for each segmented or classified object or material. This has the technical effect that different materials or objects per volume data set, such as different tissue types are rendered and shaded differently. This leads to an improvement of diagnostic relevance of the rendered image and improves quality.

Figure 3:
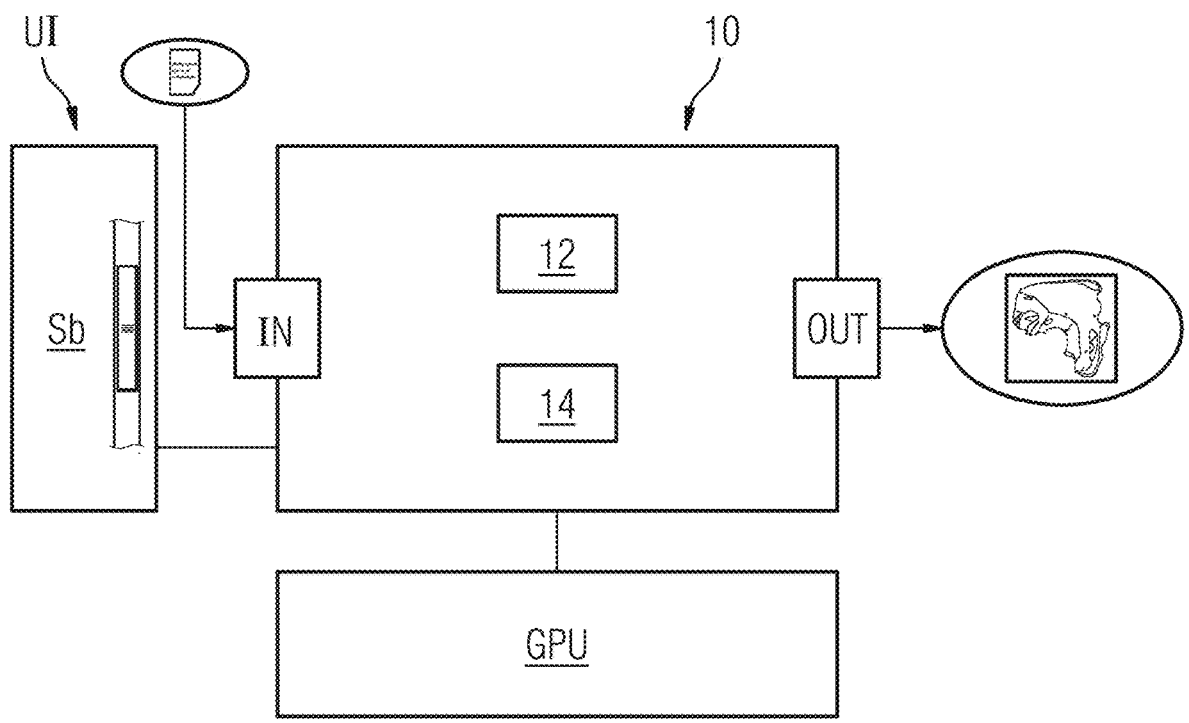
FIG. 3 is an overview figure of structural components of a system according to a preferred embodiment of the present invention.

FIG. 3 shows a block diagram of software and/or hardware entities or modules of a system 1 for rendering and shading medical volumetric data. The system 1 comprises a renderer 10. The renderer 10 may be implemented on a graphic processing unit GPU or a central processing unit CPU of a computer system. In an alternative embodiment, the renderer 10 may access such a GPU (as shown in FIG. 3) via data communication links (network connection). The system 1 further comprises a user interface UI, which comprises a slider bar sb for receiving the roughness parameter. As shown in the example embodiment in FIG. 3, the renderer 10 may be equipped with a input interface IN for receiving the volumetric data and with an output interface OUT for providing the rendered and specifically shaded image. The renderer 10 may comprise a surface scatter detection unit 12 and a modifier 14 for modifying the computation of the local gradient in the BRDF in case the surface scatter detection unit 12 has detected a surface scatter event. The interfaces IN, OUT can be embodied as a hardware interface or as a software interface (e.g. PCI-Bus, USB or Firewire).

The modified shading procedure suggested herein, which is used for rendering uses an artificial and intended modification of the received volumetric data in case a surface scatter event is identified algorithmically during rendering. The perturbation of the volumetric data is used for modifying the BRDF.

Various embodiments of the invention shows several advantages. The solution suggested herein is computationally cheap and does not require the pre-computation of a set of specular light maps for different roughness parameters, thus saving memory space. These advantages are achieved by perturbation of the local gradient using a simple procedural noise function. Further, cinematic rendering offers photorealistic image rendering results which may be further enhanced by using this technique. Especially for NDT (non-destructive testing) volume data, the use of different surface materials in volumetric rendering is essential. Finally, the perturbation of local gradients by noise, scaled by a roughness parameter permits a variety of surface materials in Cinematic Rendering. Special sampling of the specular lobe is not required using this method. The roughness of implicit surfaces is simple to control and can be made dependent on a variety of parameters, such as grey value, segmentation, gradient magnitude etc.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

A single unit or device may fulfil the functions of several items recited in the claims. The mere fact that certain measures are recited in mutually different dependent claims does not indicate that a combination of these measures cannot be used to advantage.

The renderer for rendering medical volumetric data in accordance with the method as described above can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

Wherever not already described explicitly, individual embodiments, or their individual aspects and features, described in relation to the drawings can be combined or exchanged with one another without limiting or widening the scope of the described invention, whenever such a combination or exchange is meaningful and in the sense of this invention. Advantageous which are described with respect to a particular embodiment of present invention or with respect to a particular figure are, wherever applicable, also advantages of other embodiments of the present invention.

Although the invention has been illustrated in greater detail using the example embodiments, the invention is not limited by the disclosed examples, and a person skilled in the art can derive other variations therefrom without departing from the scope of protection of the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for rendering medical volumetric images from respectively received volumetric data, using a cinematic rendering approach, based on a Monte Carlo path tracing algorithm (MCPT), the MCPT algorithm being configured to use at least one microfacet-based bidirectional reflectance distribution function (BRDF) for computing a probability how light is reflected at an implicit surface usable for shading the implicit surface, the method comprising:
computing a local gradient at a volume sampling position along a path of the MCPT algorithm;
computing a probability for a surface scatter event based on a magnitude of the local gradient and a surface scatter probability density function, wherein the surface scatter event is a probabilistic state in which scattering of the light is to be carried out according to the BRDF;
detecting if the surface scatter event is triggered based on the computed probability; and
in response to detecting that the surface scatter event is triggered,
computing a surface shading at the volume sampling position according to the local gradient for rendering the respectively received volumetric data,
receiving a user-defined roughness parameter, and
perturbing samples of the received volumetric data used for the local gradient computation by adding noise according to a Procedural noise function scaled by the received roughness parameter to obtain a modified local gradient in the BRDF for simulating surface roughness in the surface shading computation, the procedural noise function using at least one of a local grey value, segmentation classification information, object classification information, gradient magnitude, or curvature.

2. The method of claim 1, wherein the receiving the user-defined roughness parameter includes receiving the user-defined roughness parameter via a slider bar on a graphical user interface.

3. The method of claim 1, further comprising:
segmenting or classifying different objects in the respectively received volumetric data; and
applying the scaled noise function to each of a respective BRDF for each respectively segmented or classified object.

4. The method of claim 3, further comprising:
applying a different BRDF for each of the respectively segmented or classified objects, the different BRDFs respectively configured to be scaled by different roughness parameters.

5. The method of claim 1, further comprising:
comparing if accumulated opacity values along a path exceed a threshold value, the threshold value computed by executing the scatter probability density function; and
triggering the scattering event in response to the comparing indicating that the accumulated opacity values along the path exceed the threshold value.

6. The method of claim 1, further comprising:
computing the local gradient by at least one of modifying central difference samples of a central difference algorithm, or modifying higher order difference samples of a higher order difference algorithm.

7. The method of claim 1,
modifying the shading of the implicit surfaces during rendering.

8. The method of claim 1, further comprising:
accessing a memory storage in which a single non-filtered specular light map is stored, the single non-filtered specular light map usable for computing a shading with a varying surface roughness for different objects.

9. The method of claim 2, further comprising:
segmenting or classifying different objects in the respectively received volumetric data; and
applying the scaled noise function to each of a respective BRDF for each respectively segmented or classified object.

10. The method of claim 9, further comprising:
applying a different BRDF for each of the respectively segments or classified objects, the different BRDFs respectively configured to be scaled by different roughness parameters.

11. The method of claim 2, further comprising:
comparing if accumulated opacity values along a path exceed a threshold value, the threshold value computed by executing the scatter probability density function; and
triggering the scattering event in response to the comparing indicating that the accumulated opacity values along the path exceed the threshold value.

12. The method of claim 2, further comprising:
computing the local gradient by at least one of modifying central difference samples of a central difference algorithm, or modifying higher order difference samples of a higher order difference algorithm.

13. A non-transitory computer-readable medium storing program elements, readable and executable by a computer, to perform the method for rendering medical volumetric images of claim 1, when the program elements are executed by the computer.

14. A non-transitory computer-readable medium storing pro-gram elements, readable and executable by a computer, to perform the method for rendering medical volumetric images of claim 2, when the program elements are executed by the computer.

15. A renderer for rendering medical volumetric images with an input interface for receiving volumetric data, the renderer being adapted to be implemented on or to access at least one processor for executing a cinematic rendering, based on a Monte Carlo path tracing algorithm (MCPT), wherein the MCPT algorithm uses at least one microfacet-based bidirectional reflectance distribution function (BRDF) for computing a probability how light is reflected at an implicit surface used for shading the implicit surface, the renderer comprising:

the at least one processor configured to
compute a local gradient at a volume sampling position along a path of the MCPT algorithm,
compute a probability for a surface scatter event based on a magnitude of the local gradient and a surface scatter probability density function, wherein the surface scatter event is a probabilistic state in which scattering of the light is to be carried out according to the BRDF,
detect if the surface scatter event is triggered based on the computed probability, and in response to detecting that the surface scatter event is triggered,
compute a surface shading at the volume sampling position according to the local gradient for rendering the respectively received volumetric data,
receive a user-defined roughness parameter, and
perturb samples of the received volumetric data used for the local gradient computation by adding noise according to a procedural noise function scaled by the received roughness parameter to obtain a modified local gradient in the BRDF for simulating surface roughness in the surface shading computation, the procedural noise function using at least one of a local grey value, segmentation classification information, object classification information, gradient magnitude, or curvature.

16. A system for rendering medical volumetric images from received volumetric data, comprising:
the renderer of claim 15; and
an output interface configured to provide rendered medical volumetric images with varying surface roughness for different objects in the volumetric data.

\* \* \* \* \*